US009504057B2

(12) United States Patent
Ahmadi

(10) Patent No.: US 9,504,057 B2
(45) Date of Patent: Nov. 22, 2016

(54) METHODS AND APPARATUS FOR IN-DEVICE COEXISTENCE DETECTION AND MITIGATION

(71) Applicant: Apple Inc., Cupertino, CA (US)

(72) Inventor: Sassan Ahmadi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 598 days.

(21) Appl. No.: 13/629,342

(22) Filed: Sep. 27, 2012

(65) Prior Publication Data

US 2013/0303214 A1    Nov. 14, 2013

Related U.S. Application Data

(60) Provisional application No. 61/646,168, filed on May 11, 2012.

(51) Int. Cl.
*H04W 72/12*     (2009.01)
*H04W 76/04*     (2009.01)
*H04W 88/06*     (2009.01)

(52) U.S. Cl.
CPC ....... *H04W 72/1215* (2013.01); *H04W 76/048* (2013.01); *H04W 88/06* (2013.01)

(58) Field of Classification Search
CPC ................................................. H04B 1/1027
USPC ........................................................ 455/501
See application file for complete search history.

(56) References Cited

U.S. PATENT DOCUMENTS

| | | | | |
|---|---|---|---|---|
| 5,914,950 A * | 6/1999 | Tiedemann, Jr. | ....... | H04L 47/10 370/335 |
| 7,107,011 B2 * | 9/2006 | Nakazawa | ............. | H04B 17/20 455/63.1 |
| 7,177,599 B2 * | 2/2007 | Nakazawa | ........... | H04B 17/345 370/278 |
| 7,916,675 B2 * | 3/2011 | Dalsgaard | ............... | H04L 12/12 370/311 |
| 8,213,374 B2 * | 7/2012 | Harada | ............... | H04W 76/048 370/329 |
| 8,423,036 B2 * | 4/2013 | Ahluwalia | .......... | H04W 76/048 370/329 |
| 8,489,950 B2 * | 7/2013 | Huang | .................. | H04L 1/1829 714/746 |
| 8,583,131 B2 * | 11/2013 | Ahluwalia | .......... | H04W 76/048 370/311 |
| 8,614,982 B2 * | 12/2013 | Abeta | ............... | H04W 72/1215 370/329 |
| 8,725,101 B2 * | 5/2014 | Ruohonen | .............. | H04B 1/406 375/219 |
| 8,737,924 B2 * | 5/2014 | Fu | ........................ | H04B 1/1027 455/296 |

(Continued)

FOREIGN PATENT DOCUMENTS

| | | |
|---|---|---|
| WO | 2011123550 | 10/2011 |
| WO | 2012019143 | 2/2012 |
| WO | 2012021879 | 2/2012 |

OTHER PUBLICATIONS

3GPP Standard, 3GPP TR 36.816, 3rd Generation Partnership Project, vol. RAN WG2, No. V11.2.0, Dec. 22, 2011, pp. 1-44.

(Continued)

*Primary Examiner* — Hai V Nguyen

(57) ABSTRACT

Methods and apparatus for detecting and mitigating interface conditions at a multi-radio device. In one embodiment, a multi-radio device monitors and detects an in-device coexistence (IDC) interference condition which is, for example, caused by concurrent operation of radios. In response, the device notifies a network entity (e.g., a Long Term Evolution (LTE) eNodeB) of the detected IDC condition. Upon receiving the notification of the IDC condition, the network entity may implement or invoke a mitigation scheme in order to reduce the amount of IDC experienced at the client device.

20 Claims, 9 Drawing Sheets

(56) References Cited

U.S. PATENT DOCUMENTS

| | | | | | |
|---|---|---|---|---|---|
| 8,750,926 B2* | 6/2014 | Fu | ............................ | H04B 1/406 | |
| | | | | 370/229 | |
| 8,780,880 B2* | 7/2014 | Lin | .................... | H04W 72/1215 | |
| | | | | 370/345 | |
| 8,787,468 B2* | 7/2014 | Truong | ............. | H04W 72/1215 | |
| | | | | 375/132 | |
| 8,838,046 B2* | 9/2014 | Fu | ............................ | H04B 1/406 | |
| | | | | 455/67.13 | |
| 8,886,239 B2* | 11/2014 | Dayal | ............... | H04W 72/1221 | |
| | | | | 455/423 | |
| 8,897,220 B2* | 11/2014 | Kadous | ............. | H04W 72/1215 | |
| | | | | 370/328 | |
| 8,913,536 B2* | 12/2014 | Futaki | ............... | H04W 36/0055 | |
| | | | | 370/311 | |
| 8,942,633 B2* | 1/2015 | Ko | ....................... | H04W 76/023 | |
| | | | | 455/448 | |
| 8,983,448 B2* | 3/2015 | Jang | ...................... | H04W 36/20 | |
| | | | | 370/338 | |
| 9,030,992 B2* | 5/2015 | Kuchi | ..................... | H04B 7/024 | |
| | | | | 370/328 | |
| 9,131,522 B2* | 9/2015 | Behnamfar | ........ | H04W 72/1257 | |
| 9,131,523 B2* | 9/2015 | HomChaudhuri | | H04W 72/1257 | |
| 9,237,452 B2* | 1/2016 | Lee | ...................... | H04B 1/0475 | |
| 2003/0018753 A1* | 1/2003 | Seki | ...................... | H04L 12/2803 | |
| | | | | 709/219 | |
| 2004/0171351 A1* | 9/2004 | Nakazawa | .............. | H04B 17/20 | |
| | | | | 455/67.13 | |
| 2004/0179484 A1* | 9/2004 | Nakazawa | ............ | H04B 17/345 | |
| | | | | 370/278 | |
| 2006/0221926 A1* | 10/2006 | Maekawa | ................. | H04W 92/02 | |
| | | | | 370/345 | |
| 2007/0183451 A1* | 8/2007 | Lohr | ...................... | H04L 1/1678 | |
| | | | | 370/473 | |
| 2007/0191041 A1* | 8/2007 | Chapin | ............... | H04W 52/346 | |
| | | | | 455/509 | |
| 2007/0263709 A1* | 11/2007 | Kasslin | ................. | H04W 88/06 | |
| | | | | 375/222 | |
| 2007/0291728 A1* | 12/2007 | Dalsgaard | ................ | H04L 12/12 | |
| | | | | 370/347 | |
| 2008/0109841 A1* | 5/2008 | Heather | ................... | G06Q 30/02 | |
| | | | | 725/32 | |
| 2008/0109851 A1* | 5/2008 | Heather | ............... | G06Q 30/0603 | |
| | | | | 725/60 | |
| 2008/0205365 A1* | 8/2008 | Russell | ................. | H04W 88/06 | |
| | | | | 370/341 | |
| 2008/0219275 A1* | 9/2008 | Boariu | ................... | H04W 8/005 | |
| | | | | 370/401 | |
| 2009/0081962 A1* | 3/2009 | Sohrabi | ............. | H04W 72/1242 | |
| | | | | 455/79 | |
| 2009/0088177 A1* | 4/2009 | Yang | ..................... | H04W 16/14 | |
| | | | | 455/452.2 | |
| 2009/0135787 A1* | 5/2009 | Uemura | ................. | H04W 24/10 | |
| | | | | 370/335 | |
| 2009/0318087 A1* | 12/2009 | Mattila | ................... | H04B 1/109 | |
| | | | | 455/63.1 | |
| 2010/0002608 A1* | 1/2010 | Goldhamer | ............ | H04B 7/026 | |
| | | | | 370/280 | |
| 2010/0035624 A1* | 2/2010 | Tseng | ................. | H04W 76/048 | |
| | | | | 455/450 | |
| 2010/0037114 A1* | 2/2010 | Huang | .................... | H04L 1/1829 | |
| | | | | 714/749 | |
| 2010/0069112 A1* | 3/2010 | Sun | ..................... | H04W 74/085 | |
| | | | | 455/553.1 | |
| 2010/0098135 A1* | 4/2010 | Eitan | ...................... | H04B 1/109 | |
| | | | | 375/141 | |
| 2010/0197235 A1* | 8/2010 | Wilhelmsson | ....... | H04W 52/243 | |
| | | | | 455/63.3 | |
| 2010/0215004 A1* | 8/2010 | Yoo | ...................... | H04L 1/0031 | |
| | | | | 370/329 | |
| 2010/0227639 A1* | 9/2010 | Kim | .................... | H04B 1/005 | |
| | | | | 455/525 | |
| 2010/0322287 A1* | 12/2010 | Truong | ............. | H04W 72/1215 | |
| | | | | 375/133 | |
| 2011/0009136 A1* | 1/2011 | Mantravadi | ........... | H04W 88/06 | |
| | | | | 455/501 | |
| 2011/0235612 A1* | 9/2011 | Abeta | ............... | H04W 72/1215 | |
| | | | | 370/329 | |
| 2011/0235621 A1* | 9/2011 | Ko | .................... | H04W 72/1215 | |
| | | | | 370/338 | |
| 2011/0256834 A1* | 10/2011 | Dayal | ................... | H04W 16/14 | |
| | | | | 455/67.7 | |
| 2011/0256884 A1* | 10/2011 | Kazmi | ................. | H04W 48/04 | |
| | | | | 455/456.1 | |
| 2011/0268024 A1* | 11/2011 | Jamp | .................... | H04W 16/14 | |
| | | | | 370/328 | |
| 2011/0312288 A1* | 12/2011 | Fu | ............................ | H04B 1/406 | |
| | | | | 455/88 | |
| 2012/0014476 A1* | 1/2012 | Kuchi | .................... | H04B 7/024 | |
| | | | | 375/296 | |
| 2012/0020229 A1* | 1/2012 | Dayal | ................... | H04W 16/14 | |
| | | | | 370/252 | |
| 2012/0020231 A1* | 1/2012 | Chen | ..................... | H04W 36/08 | |
| | | | | 370/252 | |
| 2012/0040620 A1* | 2/2012 | Fu | ......................... | H04B 1/1027 | |
| | | | | 455/63.1 | |
| 2012/0082140 A1* | 4/2012 | Lin | .................... | H04W 72/1215 | |
| | | | | 370/336 | |
| 2012/0207040 A1* | 8/2012 | Comsa | ............. | H04W 72/1215 | |
| | | | | 370/252 | |
| 2012/0243473 A1* | 9/2012 | Kadous | ............. | H04W 72/1215 | |
| | | | | 370/328 | |
| 2012/0270557 A1* | 10/2012 | Ahluwalia | .......... | H04W 76/048 | |
| | | | | 455/450 | |
| 2012/0281563 A1* | 11/2012 | Comsa | .................... | H04W 24/10 | |
| | | | | 370/252 | |
| 2012/0294169 A1* | 11/2012 | Chui | ................... | H04W 52/0274 | |
| | | | | 370/252 | |
| 2013/0012135 A1* | 1/2013 | Ruohonen | .............. | H04B 1/406 | |
| | | | | 455/63.1 | |
| 2013/0083753 A1* | 4/2013 | Lee | ................... | H04W 72/0453 | |
| | | | | 370/329 | |
| 2013/0090142 A1* | 4/2013 | Lee | ...................... | H04B 1/0475 | |
| | | | | 455/501 | |
| 2013/0114473 A1* | 5/2013 | Awoniyi | ............... | H04W 24/10 | |
| | | | | 370/280 | |
| 2013/0150106 A1* | 6/2013 | Bucknell | ............... | H04W 16/14 | |
| | | | | 455/501 | |
| 2013/0201848 A1* | 8/2013 | Kazmi | ................. | H04W 24/00 | |
| | | | | 370/252 | |
| 2013/0201883 A1* | 8/2013 | Wang | ................... | H04W 72/082 | |
| | | | | 370/278 | |
| 2013/0203432 A1* | 8/2013 | Wang | ................... | H04W 72/082 | |
| | | | | 455/452.1 | |
| 2013/0225068 A1* | 8/2013 | Kiminki | .............. | H04W 52/0216 | |
| | | | | 455/39 | |
| 2013/0235814 A1* | 9/2013 | Wietfeldt | ............... | H04W 16/14 | |
| | | | | 370/329 | |
| 2013/0242780 A1* | 9/2013 | Dayal | ............... | H04W 24/00 | |
| | | | | 370/252 | |
| 2013/0258869 A1* | 10/2013 | Zhou | ................... | H04W 52/243 | |
| | | | | 370/252 | |
| 2013/0272260 A1* | 10/2013 | Bitran | ................... | H04W 16/14 | |
| | | | | 370/329 | |
| 2013/0273857 A1* | 10/2013 | Zhang | ..................... | H04B 15/00 | |
| | | | | 455/73 | |
| 2013/0301420 A1* | 11/2013 | Zhang | ................ | H04W 76/048 | |
| | | | | 370/241 | |
| 2013/0303214 A1* | 11/2013 | Ahmadi | ............ | H04W 72/1215 | |
| | | | | 455/501 | |
| 2014/0105087 A1* | 4/2014 | Gupta | .................... | H04B 15/00 | |
| | | | | 370/311 | |
| 2014/0235175 A1* | 8/2014 | Fu | ........................ | H04B 1/1027 | |
| | | | | 455/63.1 | |
| 2014/0235242 A1* | 8/2014 | Granzow | ................ | H04W 48/17 | |
| | | | | 455/436 | |
| 2014/0293973 A1* | 10/2014 | Lin | .................... | H04W 72/1215 | |
| | | | | 370/336 | |
| 2014/0328331 A1* | 11/2014 | Truong | ............. | H04W 72/1215 | |
| | | | | 370/336 | |
| 2015/0043363 A1* | 2/2015 | Koskinen | ............. | H04W 16/14 | |
| | | | | 370/252 | |

(56) References Cited

U.S. PATENT DOCUMENTS

| | | | |
|---|---|---|---|
| 2015/0063145 A1* | 3/2015 | Jactat | H04W 24/02 370/252 |
| 2015/0071179 A1* | 3/2015 | Zhang | H04W 52/04 370/329 |
| 2015/0245394 A1* | 8/2015 | Sharma | H04W 48/16 455/434 |

OTHER PUBLICATIONS

3GPP Draft, R2-121246, "Enhancement in DRX Solution for IDC", vol. RAN WG2, Mar. 20, 2012, pp. 1-5.

International Search Report and Written Opinion in PCT Application PCT/US2013/040646, mailed Nov. 4, 2013.

Pantech, IDC trigger procedure, 3GPP TSG-RAN WG2 Meeting #77bis R2-121310, Mar. 26-30, 2012.

New Postcom, The details of trigger for the IDC Problems, 3GPP TSG RAN WG2 Meeting #76 R2-116265, Nov. 14-18, 2011.

Alcatel-Lucent, Alcatel-Lucent Shanghai Bell, Comparision between DRX and gap-like mechanism for IDC TDM solution, 3GPP TSG-RAN WG2#77bis R2-121694, Mar. 26-30, 2012.

Office Action for Japanese Patent Application No. 2015-511783, mailed Feb. 1, 2016.

* cited by examiner

METHODS AND APPARATUS FOR IN-DEVICE COEXISTENCE DETECTION AND MITIGATION

PRIORITY

This application claims priority to U.S. Provisional Patent Application Ser. No. 61/646,168 of the same title filed May 11, 2012, which is incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The features described herein relate generally to the field of computerized devices and wireless networking. More particularly, the disclosure is directed to improved in-device coexistence (IDC) interference detection and mitigation.

2. Description of Related Technology

Many wireless-enabled user devices are equipped with a number of different radio technologies co-located on a single hardware platform. Common examples of such wireless devices include, but are not limited to laptop computers, smartphones, and tablet computers, such as the exemplary Macbook™, Macbook Pro™, Macbook Air™, iPhone™, and iPad™ manufactured by the Assignee hereof. Typical configurations of multi-radio wireless user devices consist of one or more wide-area radio access technologies such as Universal Mobile Telecommunications System (UMTS), Long Term Evolution (LTE) Worldwide Interoperability for Microwave Access (WiMAX), Code-Division Multiple Access (CDMA-2000), as well as shorter-range or personal area network (PAN) wireless technologies such Bluetooth (BT) and wireless local areas networks (WLAN), such as e.g., the IEEE 802.11-based standards, operating in Industrial Scientific Medical (ISM) frequency bands. In addition, the wireless user device may include a Global Navigation Satellite Systems (GNSS), GLONASS, or Global Positioning Satellite (GPS) receiver for positioning.

Common applications of the co-located multi-radio platforms include for example: (i) voice calls received on UMTS relayed to a BT headset, (ii) the audio portion of streaming video received on LTE relayed to the BT headset, (iii) Wi-Fi data access/Wi-Fi offloading, (iv) Wi-Fi router functionality, and GNSS receiver operation to support location-based services. When these radios operate simultaneously in adjacent or overlapping Radio Frequency (RF) spectrum, resultant interference may occur from transmission of one radio to the reception of the other radios. This situation is often referred to as "In-Device Coexistence" or IDC interference. For example, IDC interference may occur between UMTS/LTE and the ISM-band radios when the frequency separation between the bands is less than 50 MHz. With a frequency separation of less than 20 MHz, typically 50 decibels (dB) of isolation is required between radios to avoid IDC effects. Mobile wireless devices implementing a small form factor typically provide, only 10-30 dB isolation between the multiple radios. Thus, mobile devices implementing such small form factors may experience a degradation of performance on the radios experiencing IDC interference.

However, a prior art cellular base station serving the mobile device is not aware that the mobile device is experiencing an IDC interference condition (the latter which is not readily detectable at the base station). Thus, transmissions to and from the base station may be degraded, or cause degradation of the performance of other active radios used by the mobile device.

Accordingly, improved solutions are required to mitigate IDC interference without degrading the performance of each of the wireless access systems co-located on the wireless device.

SUMMARY

The present disclosure provides apparatus and methods for detecting, signaling, and mitigating multi-radio interference.

A method for mitigating multi-radio interference at a wireless device operating within a cellular network is disclosed. In one embodiment, the method includes: monitoring for at least one indication of an interference condition between at least two radio interfaces of the wireless device at a scheduled time; upon detection of the at least one indication, transmitting an in-device coexistence (IDC) Activity message to the cellular network in discontinuous reception (DRX) ON mode; upon receiving an IDC Activity Acknowledge message indicating successful receipt of the IDC Activity message, the first radio interface of the at least two radio interfaces operating in DRX OFF mode at the scheduled time to mitigate the interference condition; and subsequent to the scheduled time, operating the first radio interface in DRX ON mode.

In a first variant, the monitoring is performed using a radio interface of a second wireless device that is proximate to the wireless device.

In a second variant, the monitoring is performed using at least one of the at least two radio interfaces of the wireless device.

In a third variant, the first radio interface comprises a Long Term Evolution (LTE) compliant cellular interface, and the second radio interface operates in the Industrial Scientific Medical (ISM) frequency bands.

In a fourth variant, the second radio interface comprises a Wireless Local Area Network (WLAN) compliant interface.

In a fifth variant, the monitoring is based on an inter-chip signaling between the first and second radio interfaces.

In a sixth variant, the method additionally includes transmitting a message to the cellular network in discontinuous reception (DRX) ON mode indicating that normal Long Term Evolution (LTE) operation may resume.

A method for mitigating radio interference for at least one of a plurality of wireless devices is disclosed. In one embodiment, the method includes: receiving a first indication of an interference condition from a first of the plurality of wireless devices; receiving a second indication of an interference condition from a second of the plurality of wireless devices, the interference condition of the second of the plurality of wireless devices occurring substantially contemporaneous with that of the first wireless device; evaluating the first and second indications to determine one common feature of the interference conditions of the first and second wireless devices; and based on at least the evaluating, causing at least one of the first and second wireless devices to implement a corrective action to mitigate at least one of the interference conditions.

A wireless device is disclosed. In one embodiment, the wireless device includes: a processor; a first wireless interface in data communication with the processor; and computerized logic configured to: monitor for at least one indication of an interference condition affecting the first wireless interface; and based at least in part on the monitoring, signal a network entity to cause implementation of an action to compensate for the interference condition.

In one variant, the computerized logic configured to monitor is configured to perform the monitoring using the first wireless interface, the monitoring comprising monitoring at least one radio frequency parameter.

In a second variant, the wireless device includes a second wireless interface, and the interference condition is created by simultaneous operation of the first interface and the second interface; and the action comprises an adjustment in the operation of at least one of the first and second interfaces by the wireless device.

In a third variant, the interference condition is created by simultaneous operation of the first interface and a radio interface of a second wireless device that is proximate to the wireless device; and the action comprises an adjustment in the operation of the radio interface by the second wireless device.

In a fourth variant, the wireless device comprises a second wireless interface, and the logic configured to monitor for at least one indication of an interference condition comprises logic configured to detect an operational state which is indirectly indicative of interference between the first and second wireless interfaces.

In a fifth variant, the wireless device comprises a second wireless interface, and the signaling is performed using a one of the wireless interfaces that is least impacted by the interference condition.

In a sixth variant, the wireless device comprises a second wireless interface, and the computerized logic is configured to perform the signaling of the network entity by at least: temporarily suspending using at least one of the wireless interfaces; and during the temporary suspension, using another of the wireless interfaces to perform the signaling.

In a seventh variant, the wireless device comprises a second wireless interface, a first wireless interface comprises a long term evolution (LTE)-compliant interface, the network entity comprises an evolved Node B (eNB), the second interface comprises a WLAN interface, and the logic is further configured to: receive from the eNB at least one instruction to reduce scheduled transmission or reception times for the LTE interface; and implement at the wireless device the at least one instruction, thereby mitigating interference with the WLAN interface.

In one such variant, the scheduled transmission or reception time comprises increasing the period of one or more discontinuous reception (DRX) cycles.

A network apparatus configured to mitigate radio interference for at least one wireless device in communication therewith is disclosed. In one embodiment, the network apparatus includes: a cellular interface configured for communication with at least the at least one wireless device; computerized logic in communication with the interface and configured to: receive a first indication of an interference condition relating to the at least one wireless device; evaluate the first indication to identify at least one corrective action for the interference condition; and based on at least the evaluation, cause the at least one wireless device to implement the identified corrective action to attempt to mitigate the interference condition.

In one variant, the first indication comprises a channel quality index (CQI) obtained by the at least one wireless device, and the corrective action comprises a change to a modulation and coding scheme (MCS) of a cellular interface of the at least one wireless device.

A wireless device is disclosed. In one embodiment, the wireless device includes: a processor; coordination logic; and first and second wireless interfaces each in data communication with the processor and the coordination logic; wherein the coordination logic is configured to: obtain first and second information from the first and second interfaces as to future operation of the respective interfaces; forward at least portions of the first and second information to a network entity; and receive from the network entity at least one action, the at least one action intended to mitigate radio interference between the first and second interfaces at the future operation.

A method for mitigating multi-radio interference at a wireless device is disclosed. In one embodiment, the method includes monitoring for at least one indication of an interference condition between at least two radio interfaces of the wireless device; and based at least in part on the monitoring, signaling a network entity to cause implementation of an action to compensate for the interference condition.

A client or user device capable of multi-radio interference detection and mitigation is disclosed.

A network apparatus supporting multi-radio interference mitigation is disclosed.

A computer-readable apparatus is disclosed.

A system capable of reduced inter-radio technology interference is disclosed.

Other features and advantages disclosed herein will immediately be recognized by persons of ordinary skill in the art with reference to the attached drawings and detailed description of exemplary embodiments as given below.

All Figures © Copyright 2012 Apple Inc. All rights reserved.

DETAILED DESCRIPTION

Reference is now made to the drawings, wherein like numerals refer to like parts throughout.

Overview

Methods and apparatus for detecting the existence of, and mitigating, signal interference conditions experienced at a mobile device or other wireless-enabled apparatus are disclosed.

In one embodiment, a wireless device uses a trigger condition to detect the existence of an in-device coexistence (IDC) interference condition caused by multiple radios operating simultaneously on the device. The trigger condition is transmitted to a network entity to notify the network entity that the device is experiencing an IDC condition.

In response, the network entity may actively adjust transmission and/or reception operation with the device in an effort to mitigate the IDC inference. For example, in one exemplary implementation, user equipment (UE) may monitor signal quality metrics for detecting the existence of an IDC condition within the UE. In response, the UE will signal the serving eNodeB (eNB) in order to reduce scheduled transmission/receptions times, so as to provide efficient coexistence of the multiple operating radios of the UE with minimal impact on the normal operation and performance of those radios (and hence being substantially seamless to the user of the UP).

Detailed Description of Exemplary Embodiments

Exemplary embodiments are now described in detail. While these embodiments are primarily discussed in the context of a device having both Long Term Evolution (LTE), Bluetooth (BT), Global Positioning Satellite (GPS)/GNSS/GLONASS, and IEEE Std. 802.11-based wireless interfaces, it will be recognized by those of ordinary skill that the disclosed features and embodiments are not so limited, and can be used with other cellular and/or wireless access technologies such as (without limitation) TD-LTE (Time-Division Long-Term Evolution), TD-LTE-Advanced, TD-SCDMA (Time Division Synchronous Code Division Multiple Access) and Global System for Mobile Communications (GSM), General Packet Radio Service (GPRS), Code Division Multiple Access (CDMA) 2000 1x, CDMA 1xEVDO (Evolution Data Optimized), IEEE Std. 802.15 (PAN), and Worldwide Interoperability for Microwave Access (WiMAX).

In fact, the various features may be used in combination with any network (cellular, wireless, or otherwise) that can benefit from improved IDC detection and mitigation in accordance with various principles of the present disclosure.
Exemplary IDC Interference Condition—

Figure 1:
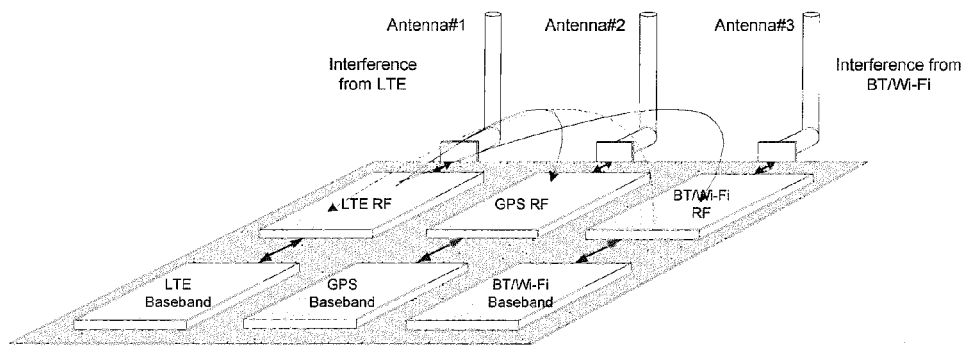
FIG. 1 is a graphical illustration of a typical prior art wireless device implementing multiple radio technologies.

Referring now to FIG. 1, an illustration of a typical prior art wireless device implementing multiple radio technologies is presented. The wireless device in this example has three RF "front-ends" consisting of an LTE front-end, GPS front-end, and at least one front end operating within the ISM band (e.g. BT, 802.11-based WLAN, etc). Each RF front end has a respective baseband processing circuitry as well as an antenna. As discussed above, a close proximity of the multi-radios operating concurrently may result in IDC interference.

Figure 2:
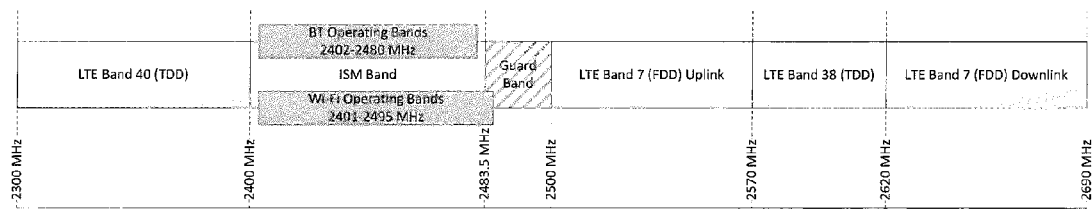
FIG. 2 is a graphical illustration of exemplary LTE bands and an ISM band which operate in close proximity.

For example, the LTE operation may occur in designated frequency bands adjacent to the ISM band as depicted in FIG. 2. Additionally, the commercial applications of e.g., GNSS receivers typically use the designated L1 band (1575.42 MHz) for location based services. The uplink (UL) direction of LTE Band 13 (777-787 MHz) and Band 14 (788-798 MHz) for example can disrupt the operation of GNSS receiver using the L1 band (1575.42 MHz). The disruption of GNSS operation may occur, for example, as the second harmonic of Band 13 (i.e., 1554-1574 MHz) and second harmonic of Band 14 (i.e., 1576-1596 MHz) are extremely close to the aforementioned GNSS L1 band, and thus may desensitize the GNSS receiver, thereby potentially causing poor reception of GNSS signals.

Furthermore, as shown in FIG. 2, the lower portion of the ISM band is very close to LTE Band 40 (TDD). In the case of LTE-BT simultaneous operation, the LTE transmitter generates interference to the BT receiver, and the BT transmitter generates interference to the LTE receiver, by desensitizing the receiver. Similar interference issues exist for LTE-Wi-Fi concurrent operation. As is also shown in FIG. 2, there is less than 20 MHz frequency separation between BT and LTE Band 7 (UL FDD). Thus, the LTE transmitter causes interference to the BT receiver. In this particular example, there is no impact on the LTE receiver from the BT transmitter, because the corresponding LTE Band 7 (DL FDD) is sufficiently far away in frequency from the ISM band.

Notably, there is only 5 MHz separation between the 802.11 (Wi-Fi) operating bands and the LTE Band 7 uplink. However, since Wi-Fi operation is limited to Channel 13 in most countries except Japan, there is often a frequency separation of 17 MHz. In case of LTE-Wi-Fi coexistence, the Wi-Fi receiver may be affected by the LTE uplink transmitter.
Radio Link Monitoring Schemes—

The radio resource management (RRM) and radio link monitoring procedures of the LTE technologies (for example, 3GPP TS 36.213 entitled "3rd Generation Partnership Project; Technical Specification Group Radio Access Network; Evolved Universal Terrestrial Radio Access (E-UTRA); Physical layer procedures (Release 10)" published December 2010, incorporated by reference in its entirety) may be used by an eNB to detect whether a UE experiencing in-device coexistence (IDC) interference. Those radio link monitoring schemes include, but are limited to: (i) reference signal received power (RSRP), (ii) reference signal received quality (RSRQ), and (iii) channel quality indicator (CQI).

RSRP is calculated only on cell-specific reference signals. RSRP does not take into consideration whether received power is serving LTE eNB power or interference power. Hence, RSRP, by itself, may not be wholly useful in determining whether UE is experiencing in-device coexistence interference, as RSRP does not provide an indication of interference. The RSRP is defined as the linear average over the power contributions (in Watts) of the resource elements that carry cell-specific reference signals within the considered measurement frequency bandwidth. For RSRP determination, the cell-specific reference signals R0 is used. If the UE can reliably detect that the R1 signal is available, it may use the R1 signal (in addition to R0 signal) to determine RSRP. The reference point for the RSRP is the antenna connector of the UE. Note that in certain implementations, if receiver diversity is in use by the UE, the reported will not be lower than the corresponding RSRP of any of the individual diversity branches.

In contrast to RSRP, RSRQ indicates not only the reference symbol power, but also the interference from both neighboring cell(s) and neighboring system(s). Hence, it can be used to indicate whether interference exists, but it cannot distinguish whether the interference is from a neighboring cell, or from concurrent operations of other technologies; e.g., ISM band radio. The RSRQ value may be less affected than expected in a situation with an intermittent interference from the ISM band. The RSRQ is defined according to Equation 1:

$$RSRQ = N \times RSRP/RSSI \quad \text{(Eqn. 1)}$$

Where:
N is the number of resources blocks (RB) of the LTE carrier;
RSRP is the reference signal received power; and
RSSI is the reference signal strength indication.

The measurements of the RSRP and the RSSI are typically performed over the same set of resource blocks. The RSSI comprises the linear average of the total received power in Watts observed only over the orthogonal frequency-division multiplexing (OFDM) symbols containing reference signals for antenna port 0, in the measurement bandwidth, over N number of resource blocks by the UE from all sources (including co-channel serving and non-serving cells, adjacent channel interference, thermal noise, etc.). If higher-layer signaling from the eNB indicates certain subframes to be used for performing RSRQ measurements, then RSSI is measured over all OFDM symbols in the indicated subframes. The reference point for the RSRQ is the antenna connector of the UE. If receiver diversity is in use by the UE, the reported value in certain implementations will not be lower than the corresponding RSRQ of any of the individual diversity branches.

CQI indicates radio link quality, which is related to not only signal power, but also interference from both neighboring cell and in-device coexistence interference. Similar to RSRQ, it cannot distinguish whether interference is from neighboring eNBs, or is caused by in-device coexistence. The CQI value may in cases e.g., of intermittent interference from the ISM band be less affected than would otherwise be expected.

IDC Interference Mitigation Schemes—

IDC interference mitigation schemes in wireless devices implementing multiple radios may be broadly classified under two groups. The first group can be classified as network-controlled (and device-assisted) solutions, while the second group can be classified as device autonomous solutions. In network-controlled/device assisted schemes, the network controls at least a portion of the implementation of the IDC interference mitigation scheme, while the device in communication with the network (e.g., a UE) provides one or more forms of assistance to the network in implementing the scheme.

In contrast, device autonomous solutions implement the IDC interference mitigation scheme independently from network control mechanisms.

Exemplary network-controlled and device assisted (e.g., a UE) schemes may include those which are (i) frequency division multiplexing (FDM) based, (ii) time division multiplexing (TDM) based, and/or (iii) power-control-based. Typical FDM-based solutions provide sufficient frequency separation between the interfering radios. For example, as shown in FIG. 2 (illustrating various LTE and ISM frequency bands), the LTE signal may be moved away from ISM band to mitigate coexistence interference by providing sufficient frequency separation. Similarly, as shown in FIG. 3 (illustrating an exemplary IDC interference between LTE signals and ISM signals (e.g., BT, 802.11, etc.)), the ISM signal can leave some portion of the ISM band to move away from LTE operation so that reception of LTE signals is filtered out, such as, for example, through a conventional band-pass filter.

When sufficient frequency separation is not possible between interfering radios, filter technology may be introduced in both the transmitter and the receiver to mitigate coexistence interference. However, it is typically only possible to reduce interference by using filters if a minimum frequency separation of 20 MHz is available between the two relevant technologies of the multi-radio wireless device. Furthermore, filter-based solutions are highly band specific, and may not be a practical solution from cost point of view.

Figure 3:
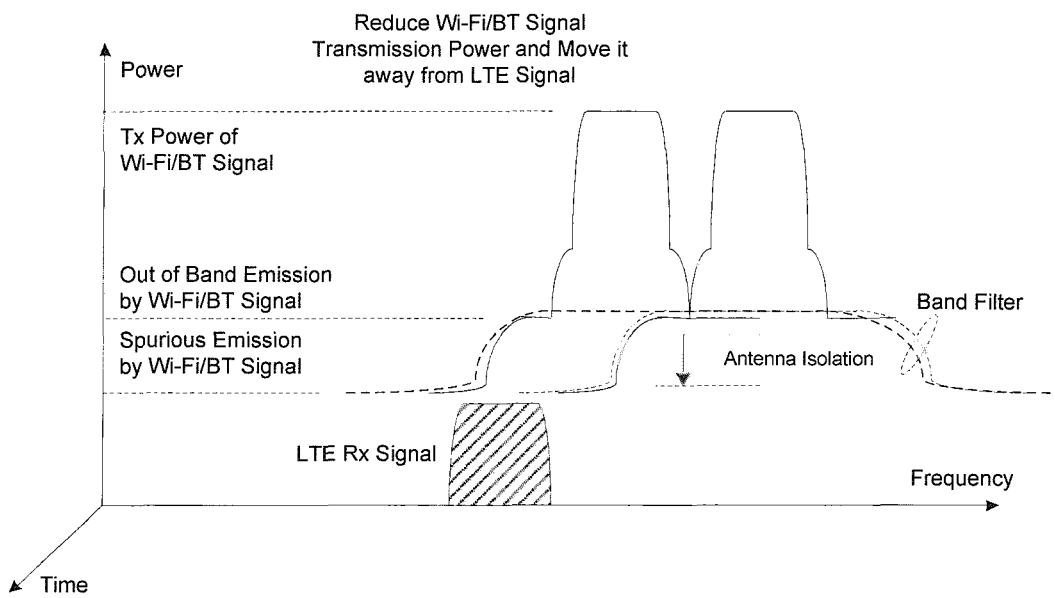
FIG. 3 is a graphical illustration of a typical prior art method of reducing inter-device coexistence interference.

In addition, while antenna isolation (as shown in FIG. 3) may provide some degree of isolation between the radios, the small form factor of the wireless device and physical proximity of the antennas on the device would be a limiting factor in the amount of isolation possible. In some cases, a common multi-band antenna may even be used for two or more separate air interfaces. Stated differently, very aggressive form factors and certain types of materials (e.g., metallic cases) may be precluded.

In exemplary TDM-based solutions, IDC interference mitigation schemes may attempt to avoid interference from one radio to another radio via time separation of the radios activities. For example, the TDM solution may exploit the frame structure implemented in different radios and/or characteristics of the multi-radio operation. However, an important pre-condition for TDM solution is to have time synchronization of radios, which may not be possible at all times. Even if such synchronization is possible, it almost necessarily adds significant overhead and cost; i.e., to support communication between the various radios that are operating at a given time.

In power-control-based solutions, the transmit power can be lowered so that coexistence becomes possible. For example, the LTE signal transmit power may be lowered so as to reduce possible interference with an ISM band signal or vice versa. However, the coexistence-based lower transmit power can result in a throughput loss or increase in latency of the UE traffic, which may not be acceptable.

With respect to exemplary device autonomous solutions, the device may implement a TDM-based solution, for example, to mitigate IDC inference by limiting concurrent use of the radios. In another example, the device may deny the performance of certain transmission requests to avoid possible interference between the radios.

In addition, radio link failure (RLF) may be used in implementing an IDC mitigation scheme. RLF initiates radio resource control (RRC) connection re-establishment, by which a UE may select an inter-frequency cell. However, declaration of RLF may include a long delay for the UE, which may have an adverse impact on user experience, especially for time-critical services such as those with QoS requirements. To reduce the delay, the RLF declaration may potentially be accelerated, but the UE may still be required to correctly distinguish whether the interference is due to in-device coexistence interference, or neighboring cell interference.

Furthermore, a handover (HO) procedure may also be used in mitigating an IDC interference condition. However, since intra-frequency cells may be interfered by the same IDC activities, the RSRQ of all intra-frequency cells might not be much better than that of the serving cell. Accordingly, a measurement report received from an inter-frequency cell may be more likely to indicate a presence of IDC interference than an intra-frequency cell measurement. However, using a HO procedure as a possible IDC mitigation solution has issues, such as for instance that all UEs must be configured with RSRQ (even those without multiple radios). Thus, it is possible that there can be unacceptable delay in triggering a measurement report before a mitigation solution can be implemented, thereby resulting in a possible loss of HO commands due to IDC interference.

While there are a number of schemes to mitigate IDC effects such as receiver desensitization and increased adjacent/co-channel interference, these typically compromise the performance of the radio systems, or interrupt the normal operation of those radios. Accordingly, it would be beneficial to enable multi-radio coexistence of for instance LTE and ISM band radios without negative impacts on LTE performance. There is no signaling mechanism within existing LTE networks to allow the UE experiencing IDC condition to inform the eNB or other network entity of the situation in advance (or during such conditions), and to allow the eNB/entity to implement remedial or corrective action such as e.g., configuring short/long DRX cycles or measurement gaps, to accommodate the UE-specific needs.

Discontinuous Reception (DRX)—

DRX is a power saving implementation which allows a UE to turn off its radio for periods of time instead of continually monitoring control channels sent from a base station. In typical implementations, when operating in a DRX mode, the UE will turn on its radio during defined intervals to monitor the control channels, and otherwise will turn its radio off. Thus, by reducing the amount of time the radio is required to be active, the UE inter alia reduces its power consumption.

During DRX, the UE maintains a DRX cycle that is defined in terms of number of subframes. Each LTE subframe is 1 millisecond, and consists of two slots and 12-14 OFDM symbols depending on the size of the cyclic prefix. The UE monitors the packet dedicated control channel (PDCCH) for a specific number of subframes in a DRX cycle. This duration is referred to as "on-duration", and can range from 1 to 200 subframes. The UE may turn off its receiver for rest of the DRX cycle. The UE maintains two DRX cycles (the Short DRX cycle, and the Long DRX cycle) which have different durations.

The Short DRX cycle is optional, and is typically targeted for applications such as VoIP which typically require relatively small transmissions of data at short but regular intervals. If so configured, the UE starts with a Short DRX cycle (2-640 subframes) when it enters the DRX mode. If the configurable Short DRX timer expires (2-640 subframes), the UE transitions to the Long DRX cycle (10-2560 subframes). The UE can transition to DRX either upon expiration of configured timers or following a DRX command.

As a brief aside, a UE may be configured by the radio resource control (RRC) sub-layer with a DRX functionality that controls the UE's physical downlink control channel (PDCCH) monitoring activity for the UE's cell radio network temporary identifier (C-RNTI), transmit power control-physical uplink control channel-radio network temporary identifier (TPC-PUCCH-RNTI), transmit power control-physical uplink shared channel-radio network temporary identifier (TPC-PUSCH-RNTI), and Semi-Persistent Scheduling C-RNTI (if so configured). When in the RRC_CONNECTED state, if DRX is configured accordingly, the UE is allowed to monitor the PDCCH discontinuously using the DRX operation; otherwise, the UE monitors the PDCCH continuously. When using DRX operation, the UE also monitors PDCCH. The RRC sub-layer controls DRX operation by configuring the following parameters: on DurationTimer, drx-InactivityTimer, drx-Retransmission Timer (one per DL HARQ process except for the broadcast process), longDRX-Cycle, drxStartOffset and optionally the drx-ShortCycleTimer and shortDRX-Cycle.

A HARQ RTT timer per downlink (DL) HARQ process is also defined. When a DRX cycle is configured, the Active Time includes the following intervals: on DurationTimer or drx-InactivityTimer or drx-RetransmissionTimer or mac-ContentionResolutionTimer is running. Alternately, a Scheduling Request is sent on PUCCH and is pending, or an uplink grant for a pending HARQ retransmission can occur (and there is data in the corresponding HARQ buffer); or a PDCCH indicating a new transmission addressed to the C-RNTI of the UE has not been received after successful reception of a Random Access Response for the preamble not selected by the UE.

Neighboring Cell Search—

Neighboring cell search, in the exemplary context of LTE, is a process of a UE performing signal measurements on detectable eNBs, and reporting the measurements to the serving eNB in order to, for example, make handover or cell reselection decisions. The measurement activities may occur in gaps in transmission/reception scheduled by the serving eNB for the UE.

Measurement gap patterns can be configured and activated by the eNB radio resource control (RRC) sub-layer. The types of cell measures performed can be classified as (i) intra-frequency measurements, and (ii) inter-frequency measurements.

For intra-frequency neighbor cell measurements, neighbor cell measurements are performed by the UE when one of the serving cells of the configured set of cells and the target cell operates on the same carrier frequency. The UE may be able to carry out such measurements without measurement gaps.

For inter-frequency neighbor cell measurements, neighbor cell measurements are performed by the UE when the neighbor cell operates on a different carrier frequency than any serving cell of the configured set of cells. The UE is typically assumed not to be able to carry out such measurements without measurement gaps.

As a brief aside, in certain system with frequency reuse capability, mobility within the same frequency layer (i.e., between cells with the same carrier frequency) is predominant. "Good neighbor" cell measurements are needed for cells that have the same carrier frequency as the serving cell, in order to ensure good mobility support and easy network deployment. Searches for neighbor cells with the same carrier frequency as the serving cell, and measurements of the relevant quantities for cells identified by the search, are needed. To avoid UE activity outside the DRX cycle, the reporting criteria for neighbor cell measurements should match the used DRX cycle.

Regarding mobility between different frequency layers (i.e., between cells with a different carrier frequency), UE may need to perform neighbor cell measurements during DL/UL idle periods that are provided by DRX or packet scheduling (i.e., gap assisted measurements).

Methods—

Figure 4:
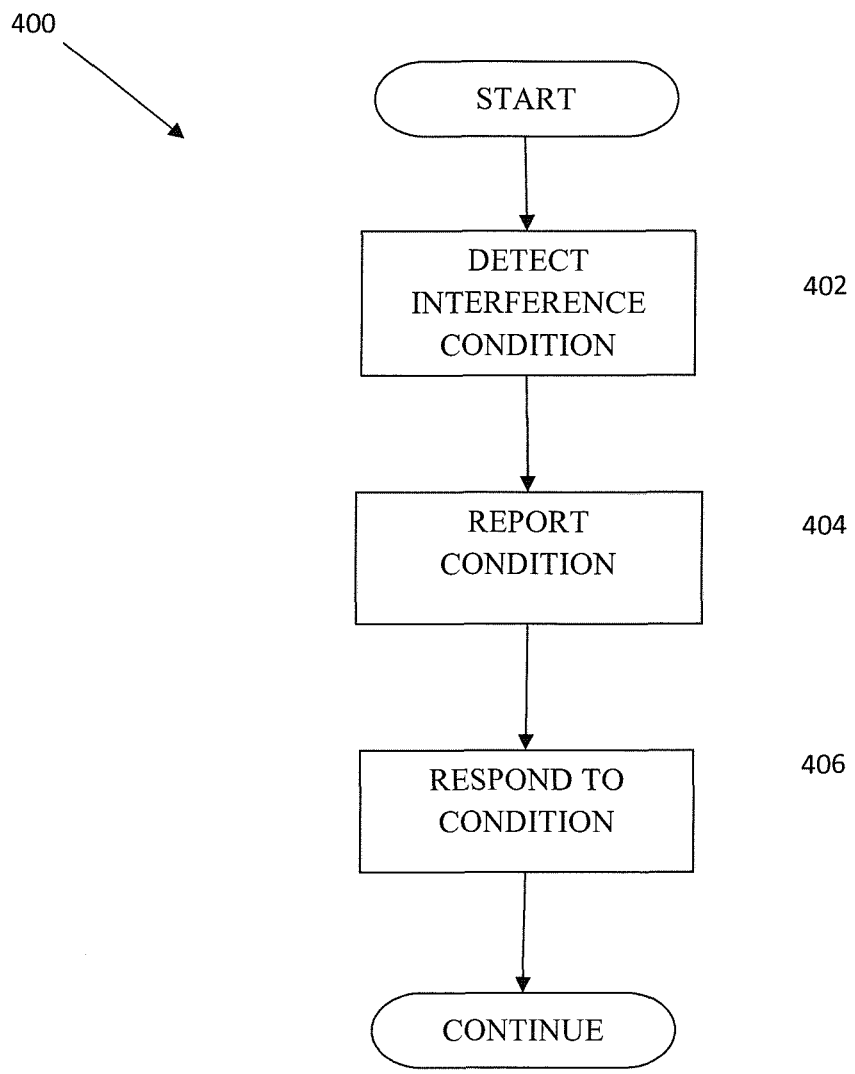
FIG. 4 is a logical flow diagram illustrating one embodiment of a generalized method for mitigating interference between wireless interfaces on multi-radio platforms.

FIG. 4 represents one embodiment of a generalized method 400 for mitigating interference between wireless interfaces on multi-radio platforms according to the present disclosure. In one exemplary implementation, the client device (e.g., UE) provides an indication to a network entity of a detected IDC interference condition. In response, the network entity can coordinate with the client device (or impose other measures) in order to mitigate interference between the multiple radios. By providing an indication of an IDC interference condition experienced at the UE, the network entity can advantageously be made aware of a situation occurring at the UE. Without such an indication, the condition may not otherwise be detectable by the network entity, because the network entity may not be able to detect the interference condition occurring at that particular UE (or for that matter any UE).

Specifically, in the exemplary context of coexistence of a co-located LTE radio transceiver with ISM band radios and GPS on a UE, current releases of 3GPP LTE specifications do not provision any eNB notification of IDC condition by the UE. As a result, the existing UE activity-control mechanisms, such as Discontinuous Reception (DRX) and measurement gaps, are solely configured by the serving eNB without IDC feedback from the UE. Accordingly, the eNB is not informed of the specific needs of the UE which is experiencing the IDC condition (which may also be wholly specific to that particular UE), in order to allow adjustment of parameters for these mechanisms (such as e.g., frequency or ON duration of DRX).

Referring again to FIG. 4, at step 402 of the method 400, the client device detects an interference condition occurring at the device. In one exemplary embodiment, the detected interference condition is an IDC interference condition resulting from the simultaneous operation of multiple radio technologies. The interference is detected in one variant by monitoring indications of increased interference which may be attributable to an IDC condition. In one implementation, the client device detects a possible IDC interference condition via monitored radio link quality. For example, the client device may monitor RSRP, RSRQ, CQI, and/or any other suitable indicators of radio channel quality. By monitoring the radio channel quality, the client device may determine that an observed reduction in channel quality may be a predictive indicator of an IDC interference condition at the device. The monitoring of the radio channel(s) may occur periodically or non-periodically, and may occur in any direction (e.g., uplink, downlink) as applicable.

In another implementation, the client device "indirectly" detects an IDC condition by identifying the occurrence or invocation of a procedure possibly attributable to IDC interference. For example, Radio Link Failure (RLF) may occur when in-device coexistence interference deteriorates the DL radio link quality of LTE. Furthermore, a handover (HO) procedure to another base station (e.g. eNB) may indicate the presence of an IDC interference condition, as a HO may be triggered when the RSRQ is configured for mobility has been sufficiently deteriorated by in-device coexistence interference. Hence, the present disclosure contemplates use of such indirect or "passive" mechanisms to identify potential IDC conditions.

In another variant, the IDC interference condition is detected by communication from the various radio devices concerning scheduled operation of the respective radio devices. Accordingly, the information contained in communications concerning scheduled operation can be used to determine if the two or more radios devices which are scheduled to operate concurrently are known to create an IDC interference condition. If so, the scheduled concurrent operation is interpreted as a detected IDC interference condition. The communication between the various radio devices may occur directly between the multiple radio interfaces of the device, and/or may be communicated with a centralized entity responsible for monitoring and detecting the IDC interference condition (e.g., one interface communicates to an external entity, which then communicates to the other interface).

In another embodiment, the client device may monitor multi-radio related activities, such as e.g., monitoring and camping on another RAT (e.g., CDMA2000, 1×Evolution-Data Optimized (EV-DO), UMTS, GSM) while connected to the LTE network without need to interrupt normal LTE operation. Periodic and/or non-periodic measurements or other internal signaling mechanisms may be used to generate an uplink notification message for the serving base station to inform it of the other co-located wireless activities in the UE.

At step 404 of the method 400, the client device reports the detected condition to the network entity e.g., via RRC messaging, etc. In one embodiment, the client device reports to the network the presence of an IDC interference condition experienced or presumed at the device. The detected condition may be reported once, periodically, or non-periodically. For example, the client device may immediately report the condition upon detection, or wait a predetermined time before reporting (such as to permit an opportunity to determine if the condition was merely transient or spurious). Additionally, the detected condition may be reported to the network entity upon a request by the network entity; e.g., in response to a periodic or event-driven request.

In one implementation, the client device utilizes a substantially "binary" scheme, such as where a UE reports only a status indicator that the client device is or is not experiencing an IDC interference condition. In another variant, the client device reports one or more metrics to the network entity useful in determining the extent of the IDC interference condition (e.g., RSRP, RSRQ, CQI), but the client does not itself make the determination itself.

In yet another implementation, a given client is not itself equipped to make a determination of IDC interference (and/or to obtain the metrics as above to pass to a network entity to make the determination), but rather obtains them from a peer device (e.g., another UE) with which the first UE can communicate (e.g., via a Wi-Fi or PAN link). In one such variant, the proximity of the UE is determined by the establishment of the PAN link; i.e., when the other UE is close enough to be in PAN contact with the target UE, it is then deemed sufficient to measure metrics for the target UE.

At step 406 of the method 400, the client device and network entity respond to the reported interference condition. In one embodiment, the network entity will modify one or more operational parameters in order to mitigate IDC interference, such as by reducing concurrent operation between the interfering radio devices. In one implementation, modified operational parameters relating to scheduled operation are adjusted so as to be performed less frequently. For example, in the context of LTE, the DRX timers can be adjusted to schedule longer periods of time where the UE does not have to monitor for a downlink control channel, thereby reducing the time the LTE interface is in operation. In addition, gap measurements may be adjusted so that the UE performs and reports neighbor cell search measurements less frequently, again so as to reduce the time the LTE radio is active.

In one variant, the adjustment of the parameters is determined at least in part by the feedback reported by client device. The parameters may be adjusted according to reported signal quality indications, and/or based on the type of radio interfaces determined to be active at the same time. The various radio interfaces may have particular operational requirements that must be met in order to maintain a suitable level of performance. For example, in 802.11-based WLAN, the 802.11-based radio interface must listen periodically for beacon signals from access points (AP) in order to be able to detect and connect to the AP, through passive scanning. Accordingly, the parameters may be adjusted taking into account such aforementioned operational requirements. The eNB may be able to, e.g., estimate the ISM radio activity time from the type of the radio information provided by the UE, and the eNB may adjust the DRX and/or measurement gap parameters according to the ISM-radio transmission intervals. For instance, the ISM band radio activity typically takes 3 milliseconds for 802.11 and 3.75 milliseconds for BT, which may be accounted for in the adjustment of the various parameters.

In another implementation, the other procedures (i.e., acknowledgement of the trigger by the eNB, reduction or cessation of uplink/downlink data/control information transmission to the UE, and resumption of the normal operation upon resolution of the condition at the UE) remains the same.

Example Operation—

Figure 5:
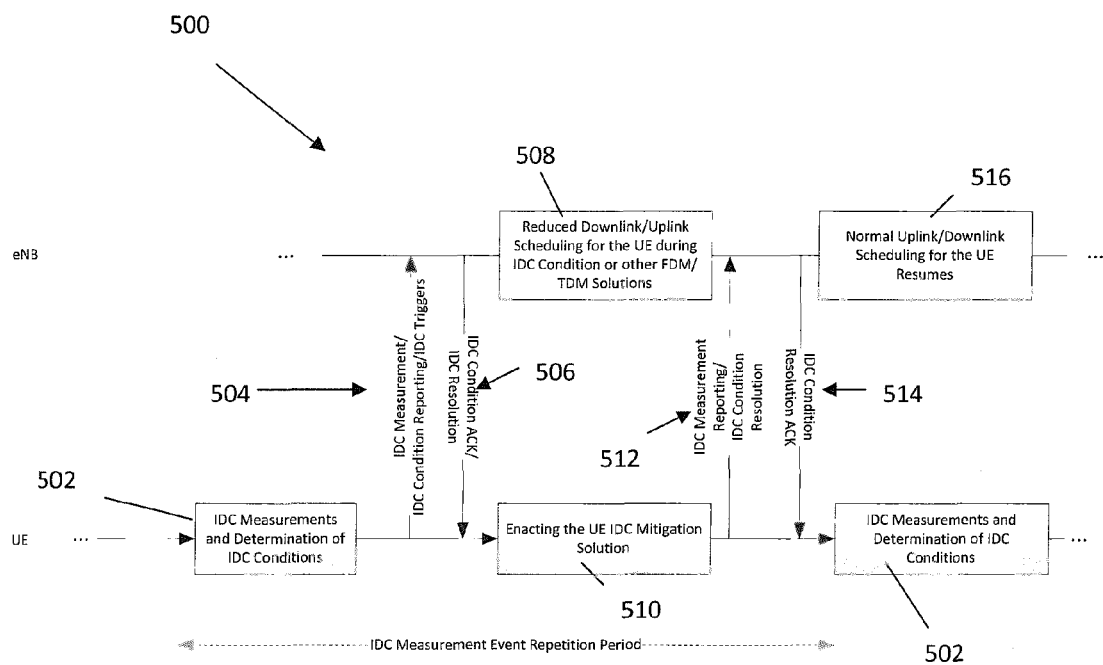
FIG. 5 is a logical flow diagram illustrating one exemplary particular implementation of the generalized methodology of FIG. 4.

FIG. 5 is a logical flow diagram illustrating one exemplary implementation 500 of an improved IDC inference detection, signaling, and mitigation scheme in accordance with the general method 400 of FIG. 4.

At step 502, the UE monitors channel quality indications to detect that an IDC interference condition exists. The IDC condition is detected in this example by determining an indication of interference effects by monitoring the RSRQ and CQI of the LTE radio link. As discussed supra, the RSSI of the received signal at the LTE receiving will increase as a result of co-channel and/or adjacent-channel interference from ISM-band radio activity. The RSRQ of Equation 1 can be redefined as Equation 3 in accordance with Equation 2 as follows:

$$RSSI = 12N(\hat{E}_S + I_{o_{total}}) \quad \text{(Eqn. 2)}$$

Where:
N is the number of resource blocks;
$I_{o_{total}}$ is the received interference;
$\hat{E}_S$ is the RSRP; and $$RSRP(dB) = 10 \log_{10}[\hat{E}_S/(12(\hat{E}_S + I_{o_{total}}))] \quad \text{(Eqn. 3)}$$

As shown in the Equation 3, the total interference will increase RSSI and will decrease RSRQ; however, as discussed previously, the interference does not affect RSRP measurements. Thus, measurement of a decreasing value of RSRQ would be an indication of increased interference, but not necessarily an indication of an IDC condition. As used herein, the logarithm (log) function is in base ten (10). However those of ordinary skill in the related arts will recognize that other bases may be freely interchanged without departing from the principles described herein.

However, the UE additionally will in this example take into account a CQI measurement. CQI is generally used in selecting the best modulation and coding scheme under current channel conditions. CQI may be further used in calculating priority metrics for packet scheduling algorithms. The CQI measurement typically consists of four basic steps as follows: 1) measuring signal to interference and noise ratio (SINR), 2) introducing measurement error to SINR, 3) converting SINR values to discrete CQI steps, and finally 4) CQI reporting with a specific scheme. Ideal linear SINR is calculated for each physical resource block (PRB) number (n) from the received pilot power and total interference at every measurement period. Thus, the measured linear SINR value for each PRB n is converted into decibels as described by Equation 4:

$$SINR_{dB}(n) = 10 \log_{10}[SINR_{linear}(n)] + \square(dB) \quad \text{(Eqn. 4)}$$

Where:
$SINR_{linear}(n)$ is the ideal linear SINR calculated from received pilot power and total interference for each PRB(n); and
$\square(dB)$ is a Gaussian distribution error with zero-mean and parameter specified variance.

The SINR values are converted to discrete CQI values in accordance with Equation 5:

$$CQI_{dB}(n) = QStep_{dB} \times floor(SINR_{dB}(n)/QStep_{dB} + 0.5) \quad \text{(Eqn. 5)}$$

Where:
$QStep_{dB}$ is a quantization step.

Similar to RSRQ, the CQI cannot distinguish whether interference is from neighboring eNBs, or caused by in-device coexistence. For example, the CQI value might not be as significant as would be expected, because interference from ISM band radios may be intermittent. The CQI is measured at certain time intervals, which span integer multiplies of Transmission Time Interval (TTI). The measured CQI values are typically reported with a certain delay and by a CQI reporting scheme. The basic scheme reports CQI for a number of consecutive physical resource blocks. It is possible to change the granularity of basic reporting scheme by changing the number of CQI reports per TTI or the fraction of the system bandwidth for which the CQI is reported (i.e., wideband or sub-band CQI). The sub-band CQI reporting is accomplished in one implementation by measuring and averaging the individual CQI values for the consecutive physical resource blocks within the sub-band. The minimum granularity is achieved by wideband CQI, which is an average value calculated for all physical resource blocks over the entire system bandwidth.

While decreasing values of RSRQ and wideband/sub-band CQI may not be a definite indication of IDC condition, unsatisfactory values of these two metrics (whether alone or considered in light of each other) would suggest that normal operation of the LTE radio may not be possible due to increased interference. The UE in this example interprets the increased interference, as depicted by RSRQ and CQI, as a detected IDC interference condition, and proceeds to report the detected to the eNB per step 504.

At step 504, the UE sends an uplink control message to the serving eNB to inform the eNB that the UE is experiencing an IDC interference condition. The uplink control message includes in one exemplary implementation an IDC trigger message, measurements relating to the IDC condition, and additional information relating to the IDC condition, such as for example the type of radios involved in the IDC interference.

At step 506, in response to receiving the message from the UE, the serving eNB will transmit an IDC condition acknowledgment (ACK) to the respective UE. Upon a determination that the eNB may institute IDC mitigation, the eNB proceeds to step 508.

At step 508, the eNB institutes an IDC interference mitigation solution by reducing the scheduling for downlink and uplink transmissions of the UE experiencing the IDC condition. The serving eNB may reduce or stop UE uplink traffic/control signaling transmissions, as it may cause interference with the other radio(s), and/or downlink traffic/ control signaling transmissions, as the LTE receiver might be de-sensitized by the other radio(s)'s transmission, until the IDC condition is resolved. In the ease of configuring DRX, the eNB in this example configures short/long DRX cycles according to specific needs of the UE until the IDC condition at the UE is resolved. In the instance of coexistence of LTE and BT radios, an indefinite short DRX cycle may be configured to the UE. The new values of drxShort-CycleTimer may be defined and used by the serving eNB in order to instruct the UE to follow short DRX cycles until resolution of the IDC condition, since by default the long DRX cycle will be enacted after expiration of the short DRX timer.

Furthermore, the uplink HARQ protocol is modified consistent with the DRX configuration. For example, the uplink HARQ transmissions/retransmissions during DRX inactivity time are suspended until resolution of the IDC condition at the UE and resumption of normal operation. Any pending uplink transmissions and retransmissions after the end of onDuration may be either continued in the next DRX cycle or discarded. If the HARQ retransmission probability is low under good channel conditions, the retransmissions may be ignored by both the eNB and UE.

At step 510 of the method 500, upon receiving the IDC condition ACK signal from the serving eNB, the UE begins to enact the IDC mitigation solution. The UE mitigates IDC interference by scheduling ISM-band radio transmission not to occur at the same time as LTE-band reception, where possible, as indicated by the reduced DRX scheduling. The UE may enact addition mitigation solutions as discussed previously within.

At step 512, the UE notifies the serving eNB that the internal IDC condition is resolved, upon a detection that the IDC condition no longer exists, by sending an uplink RRC message containing information about IDC condition resolution. IDC condition resolution may include an indicator of IDC resolution and/or metrics useful by the eNB to confirm IDC resolution.

At step 514, in response to properly received IDC condition resolution message, the eNB transmits an IDC condition resolution ACK to the UE. After transmitting the IDC condition resolution ACK, at step 516 the eNB resumes the normal scheduling of the uplink/downlink for the UE.

In response to receiving the IDC condition ACK, the UE proceeds back to step 502 and resumes monitoring for another IDC condition occurrence.

One salient advantage of the exemplary implementation described supra is that the exemplary IDC detection and signaling scheme has minimal impact on the current LTE standards, in that many of the functions such as RSRP, RSSI, RSRQ, and CQI measurements are already defined in these standards. Accordingly, the exemplary implementations can be implemented with minor additions/modifications to existing messaging to convey the IDC (or other concurrent multi-radio activity) trigger and acknowledgement, and/or modifications to short/long DRX configurations to accommodate low or no UE LTE-related activity during ISM band radio transmissions or receptions). It is also contemplated that at least portions of the foregoing exemplary sequence of FIG. 5 can be obviated (or other approaches used) such that the changes to extant standards are even further minimized, such as by e.g., eliminating "ACK" messages, or utilizing extant signaling or messaging protocols (versus implementing new messages).

Exemplary Timing Schemes

Figure 6:
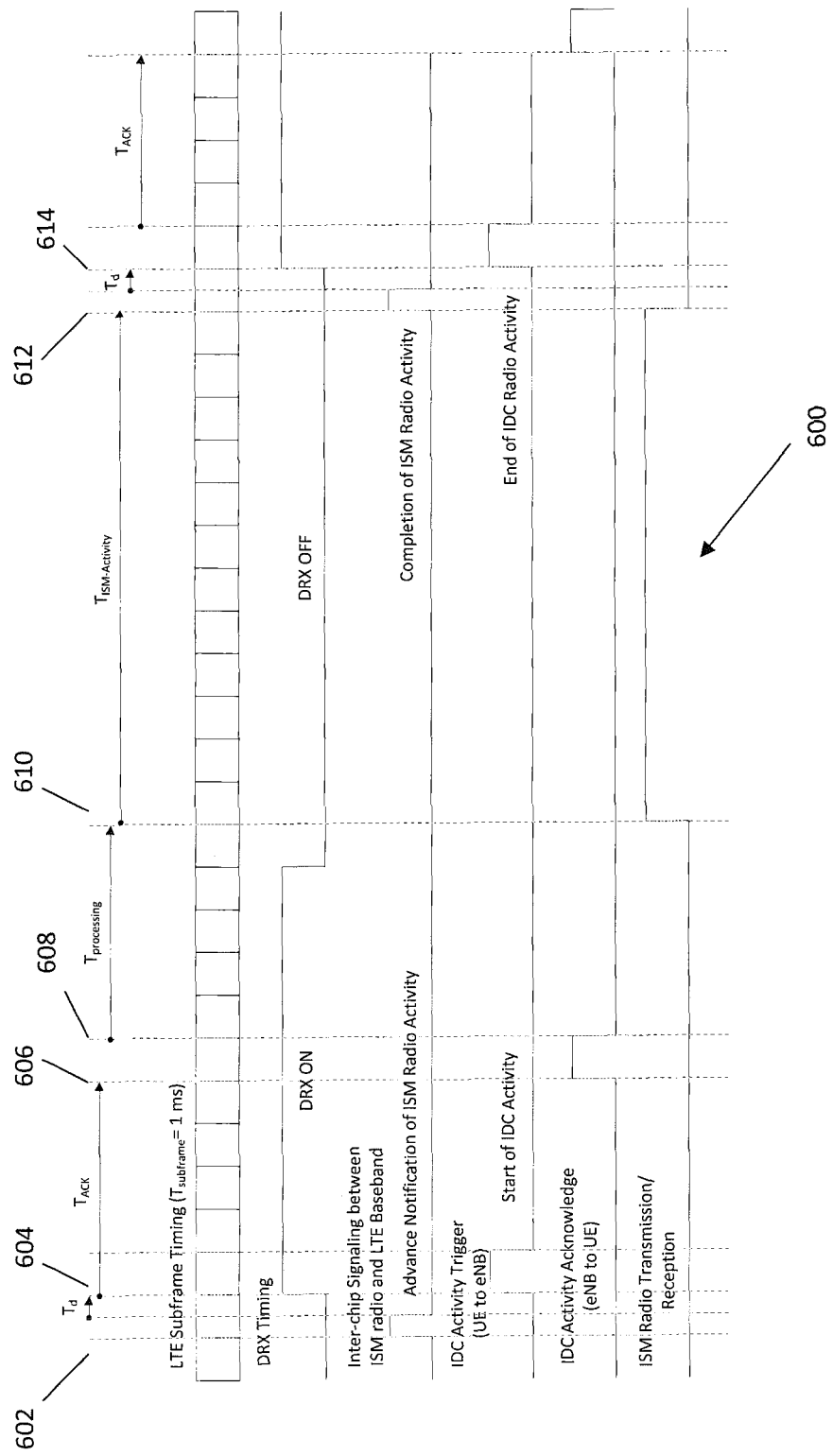
FIG. 6 is an exemplary timing diagram illustrating signaling between a user equipment (UE) and a base station (eNodeB) implemented with inter-chip advanced notification in accordance with one disclosed embodiment.

Referring now to FIG. 6, an exemplary timing diagram 600 of signaling between an UE to an eNB implemented with inter-chip advanced notification in accordance with the disclosed principles is shown and described.

It is noted that the timing diagram of FIG. 6 includes timing based on LTE subframes. As a brief aside, in an effort for an LTE system to maintain synchronization of communication between the eNB and a UE, the LTE frame and subframes structures were defined to have set lengths. A subframe has a length of one (1) millisecond, and a frame consists of ten (10) subframes.

The timing diagram 600 further includes DRX timing. A status of DRX ON indicates that the eNB and UE can be scheduled to perform LTE tasks, such as channel monitoring, cell measurements, etc. A status of DRX OFF indicates that the LTE functionality between the eNB and UE is not available. The unavailability of the LTE functionality may be implemented, for example, via disabling the LTE interface or by putting the LTE interface in a sleep or other power saving mode.

Inter-chip signaling between the ISM radio and LTE baseband located within the UE is included in the exemplary timing diagram 600. The inter-chip signaling is used to indicate that a possible concurrent use of the radios is being scheduled that is known to be prone to IDC interference. Accordingly, the UE in one implementation utilizes the inter-chip signaling to detect the presence of an IDC interference condition. In one embodiment, the inter-chip signaling is performed over a dedicated interface (e.g., serial port interface (SPI), Inter-Integrated Circuit (I2C), universal asynchronous receiver transmitter (DART), general purpose input output (GPIO), etc.). In other embodiments, IDC signaling is performed indirectly e.g., via software executing on a host processor or entity.

The timing diagram 600 further comprises the timing of the IDC Activity Trigger. The IDC Activity Trigger is transmitted from the UE to the eNB in order to notify the eNB of an IDC interference condition at the UE. Further, timing for the IDC Activity Acknowledge is provided, which is sent from the eNB to the UE to indicate that the eNB received the UE's IDC Activity Trigger.

Lastly, the exemplary timing diagram 600 includes the ISM Radio Transmission/Reception timing, which indicates when the UE is actively transmitting or receiving signals over the ISM-band radio interface.

At time 602, the inter-chip signaling indicates advanced notification of future scheduled ISM radio activity, which as discussed previously, is used to detect the occurrence of an IDC interference condition. However, since the inter-chip advanced notification signal may arrive at the LTE baseband circuitry during an LTE subframe interval, the transmission of the trigger message is deferred to a first transmission opportunity during a DRX ON interval, the time deferred-to being indicated in the Figure as the time period $T_d$.

At time 604, DRX ON is enabled, thereby allowing for LTE operation between the UE and the eNB. The UE transmits the IDC Activity Trigger during the period of an LTE subframe to the eNB to notify the eNB of an IDC condition. The time for the eNB to receive the IDC Activity Trigger and send an IDC Activity Acknowledge to the UE is indicated as time period $T_{ACK}$.

At time 606, the UE receives IDC Activity Acknowledge from the eNB, notifying that the eNB properly received the IDC Activity Trigger. After receiving the IDC Activity Acknowledge, at time 608 the UE begins instituting IDC mitigation schemes at the device as well as receiving the updated LTE uplink/downlink scheduled by the UE in response to the IDC Activity Trigger. The time period to process the IDC mitigation solution is indicated as $T_{process}$- ing. In addition, in the instance of eNB rescheduling, the UE rescheduling may be deferred to next available DRX ON duration, as, for example, the UE may expect scheduling grants from the serving eNB only during an active time.

At time 610, the UE begins ISM radio transmission/reception activity. Note that the DRX Timing is scheduled as DRX OFF to deactivate the LTE radio, in order to prevent the IDC condition cause by concurrent operation of the ISM and LTE radios.

At time 612, the scheduled ISM radio operation has completed causing the inter-chip signaling to indicate the completion of the ISM radio activity to the UE. As discussed previously, the UE must wait a period of $T_d$ for a DRX ON in order to transmit an IDC Activity Trigger to the eNB to indicate that the IDC condition is resolved.

At time 614, the UE transmits the IDC Activity Trigger to the eNB in order to signal resolution of the IDC condition and that normal LTE operation may resume. After a period of $T_{ACK}$, the UE receives the IDC Activity Acknowledge from the eNB to indicate that the eNB successfully received the IDC Activity Trigger. If the UE does not receive the IDC Activity Acknowledge, the UE may attempt to resend the IDC Activity Trigger at the next suitable time.

Figure 7:
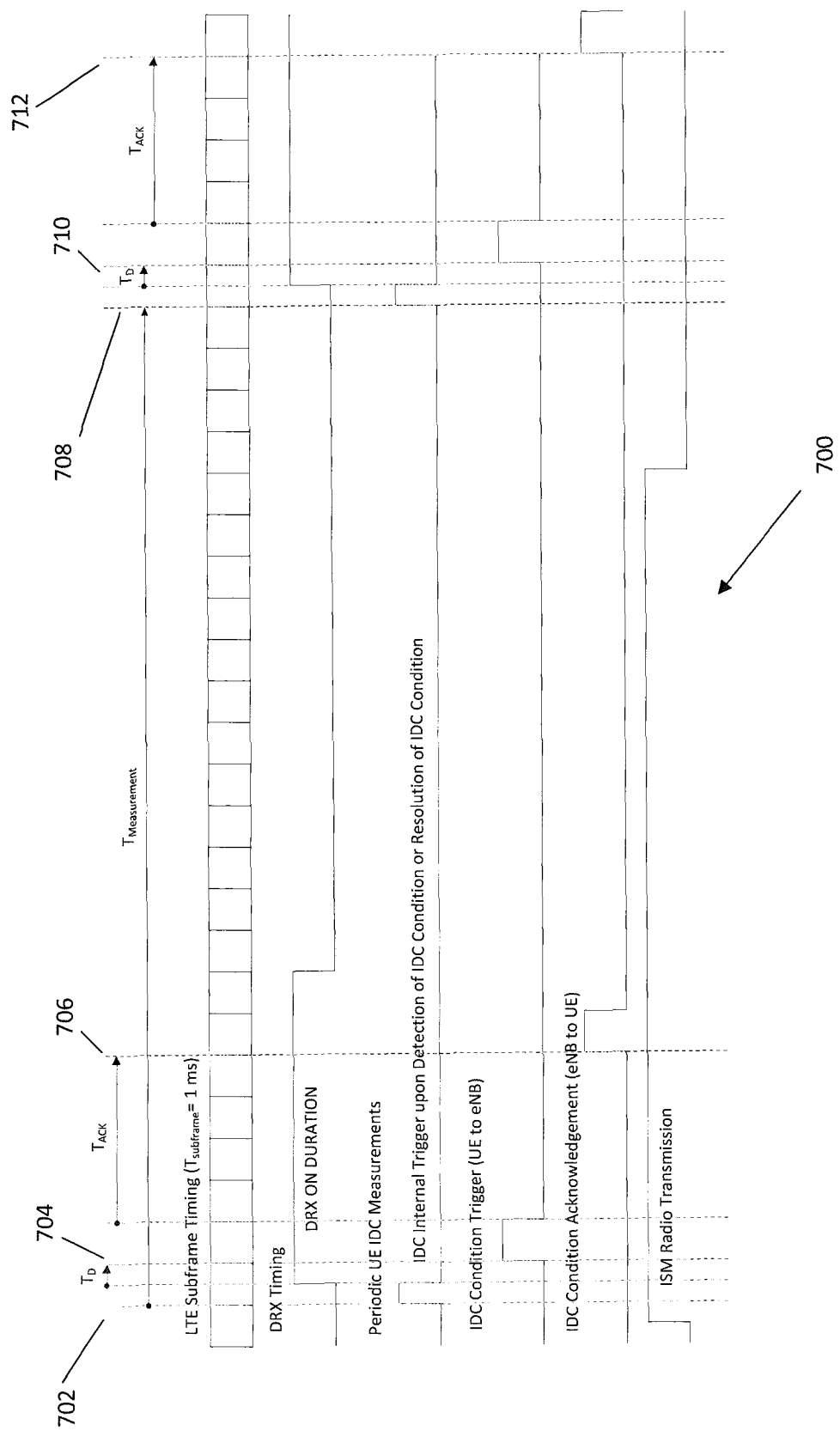
FIG. 7 is an exemplary timing diagram illustrating signaling between a user equipment (UE) and an eNodeB without implementing inter-chip advanced notification according to one disclosed embodiment.

Referring now to FIG. 7, an exemplary timing diagram 700 of signaling between an UE to an eNB which does not implement inter-chip advanced notification signaling, is illustrated. Compared to the timing diagram 600 of FIG. 6, the timing diagram 700 replaces the inter-chip signaling with periodic UE IDC measurements performed to detect the occurrence of an IDC condition. The IDC measurements can be performed for example as periodic measurements, the period of the measurement being indicated as $T_{Measurement}$. In addition, the IDC Activity Trigger is replaced by the IDC Condition Trigger. The IDC Condition Trigger is in one implementation a signal transmitted from the UE to the eNB to indicate an IDC condition is present at the UE.

At time 702, the periodic UE IDC measurement is performed as dictated by $T_{Measurement}$. In this exemplary illustration, the IDC measurement has detected an IDC condition cause from active transmission over the ISM-band radio. The UE is notified of the IDC condition in order for the UE to transmit the IDC Condition Trigger to the eNB. However, as the IDC condition was detected during a LTE subframe, the IDC Condition must wait a period of $T_D$ for the beginning of the next subframe and DRX ON.

At time 704, IDC Condition Trigger is transmitted from the UE to the eNB. In response to receiving the IDC Condition Trigger, the eNB transmits an IDC Condition Acknowledgement to UE to indicate that the eNB successfully received the IDC Condition Trigger. Furthermore, the eNB begins instituting revised UE scheduling in order to mitigate possible IDC interference.

The time 706, the UE receives the IDC Condition Acknowledgement taking a period of $T_{ACK}$ to receive since time C04.

At time 708, the UE performs another periodic IDC measurement as predetermined by $T_{Measurement}$.

As can be seen from the timing diagram 700, the ISM Radio transmission has ceased causing the IDC measurement to detect that the IDC condition has been resolved. In response to the detected IDC resolution, the UE is notified with a signal indicating resolution of the IDC condition. The UE must wait a period of $T_D$ before it can transmit the IDC Condition Trigger to the eNB.

At time 710, the UE transmits the IDC Condition Trigger to the eNB to indicate that the IDC condition has been resolved, and that the eNB may resume normal operation. In response, the eNB transmits an IDC Condition Acknowledgement to the UE which is received at time 712.

Exemplary IDC Coordination Mechanism

Figure 8:
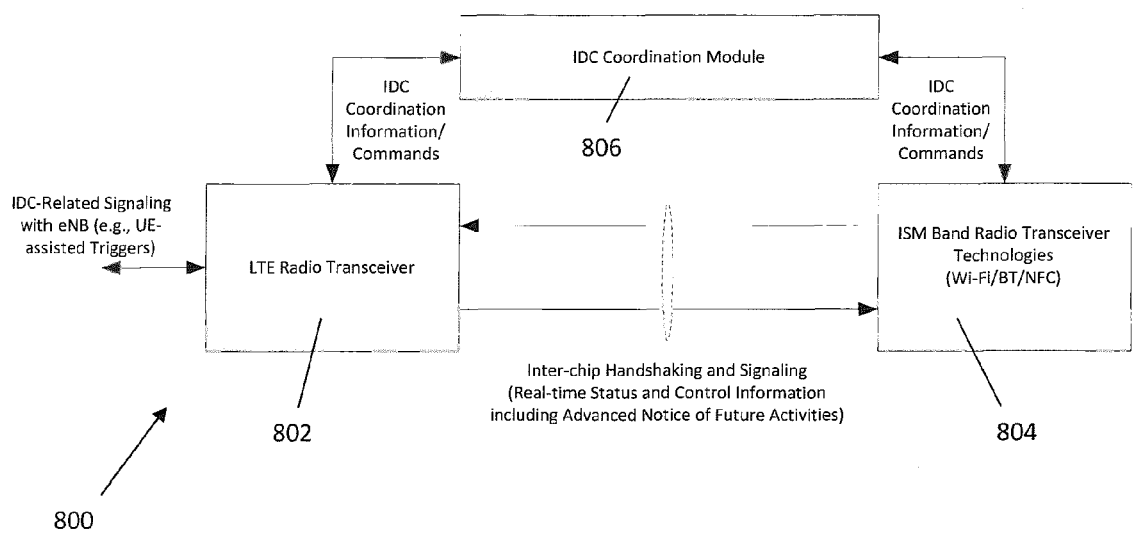
FIG. 8 is a functional block diagram illustrating an exemplary IDC coordination mechanism between multiple radio devices according to one disclosed embodiment.

FIG. 8 is a functional block diagram illustrating an exemplary embodiment of an IDC coordination mechanism 800 between multiple radio devices. In this exemplary embodiment, the baseband processing circuitry of the LTE radio 802 and the baseband processing circuitry of an ISM-band radio 804 are in data communication with each other. The baseband processing circuitry of LTE and ISM band radios are separated, whether within the same chip from the same vendor or different chips from the same or different manufacturers. In either case, the two chips may exchange handshake signals (herein referred to as inter-chip handshaking and signaling) to convey information such as e.g., real-time status and control information including advanced notice of future activities. These advanced notification signals can in one implementation be used as a trigger to notify the serving eNB of forthcoming IDC conditions. In response to the notification signals, the eNB can suspend normal UE LTE operation during the ISM band radio activities, and resume normal operation once the IDC condition is resolved. The advanced notification can be complementary to the CQI/RSRQ-based detection mechanism described supra.

Note also that other physical metrics instead of or in addition to RSRQ and CQI can be used for determination of ongoing IDC condition, and are contemplated by the present disclosure.

The baseband processing circuitry of the LTE and ISM radios 802, 804 are also in data communication with the IDC coordination module 806. The IDC coordination module 806 shown in the block diagram is responsible for coordination and prioritization among different co-located radios, obtaining and interpreting the coordination information from different radios, and generating control commands to different radio modules including but limited to generation of the IDC trigger messages in the uplink (to be transmitted via LTE transceiver module), interpretation of the IDC acknowledgement messages, etc. Accordingly, the IDC coordination may further reduce possible IDC interference by scheduling non-concurrent use of the multiple radios whenever possible.

Exemplary Client Apparatus—

Figure 9:
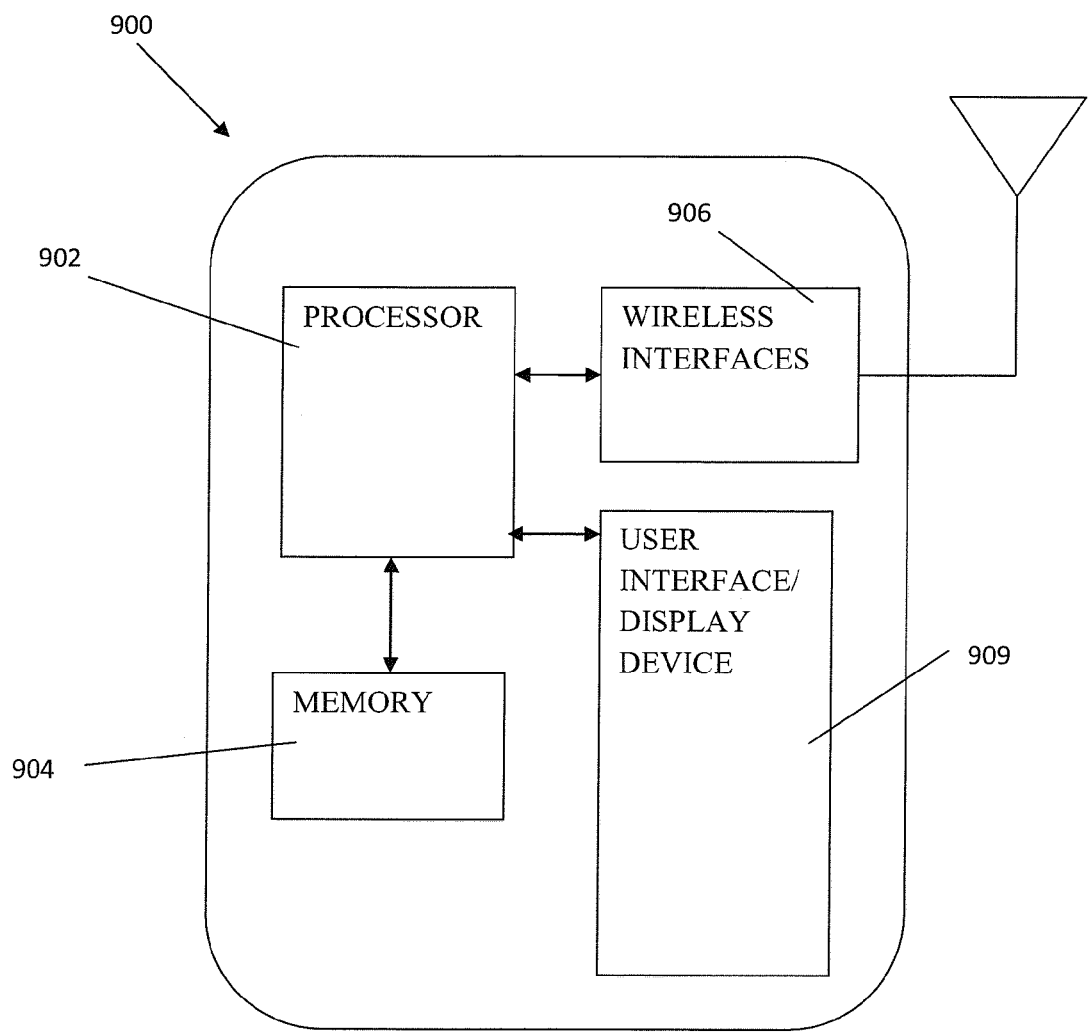
FIG. 9 is a functional block diagram of an exemplary user device configured to detect and signal IDC conditions, according to one disclosed embodiment.

Referring now to FIG. 9, an exemplary embodiment of a user device or apparatus 900 to detect and signal a multi-radio interference condition is illustrated. As used herein, the terms "user device" "client", and "user equipment" may include, but are not limited to, cellular telephones, smartphones (such as for example an iPhone™ manufactured by the Assignee hereof), handheld or tablet computers, personal media devices (PMDs), laptop or mobile computers, or any combinations of the foregoing. While a specific device configuration and layout is shown and discussed, it is recognized that many other configurations may be readily implemented by one of ordinary skill given the present disclosure, the apparatus 900 of FIG. 9 being merely illustrative of the broader principles of disclosed herein.

The processing subsystem 902 includes one or more of central processing units (CPU) or digital processors, such as a microprocessor, digital signal processor, field-programmable gate array, RISC core, a baseband processor, or plurality of processing components mounted on one or more substrates. In some embodiments, one or more of the above-mentioned processors (e.g. the baseband processor) are further configured to implement the detection and mitigation multi-radio interference solutions described previously herein, such as by running one or more programs thereon.

The processing subsystem is coupled to non-transitory computer-readable storage media such as memory 904, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also include additional co-processors, such as a dedicated graphics accelerator, network processor (NP), or audio/video processor. The processing subsystem 902 of FIG. 9 includes discrete components; however, it is understood that in some embodiments they may be consolidated or fashioned in a SoC (system-on-chip) configuration.

The apparatus 900 further includes one or more wireless interfaces 906 which are configured to transmit and receive signaling, as well as a user interface and/or display device 909 such as e.g., a multi-touch touch screen capable of both display and receiving user input.

In one exemplary embodiment, the non-transitory computer-readable storage media includes instructions which when executed by the processor, monitors parameters useful in detecting a multi-radio interference condition. In response to detecting the interference condition, an interference indicator is transmitted from apparatus 900 to a server apparatus to implement a multi-radio interference mitigation scheme configured in accordance with various principles disclosed herein. The apparatus 900 will in one implementation continually or periodically monitor the interference condition to determine when the interference condition has been resolved. In response to the detection interference resolution, the apparatus 900 will transmit another indicator to a server apparatus to notify the server apparatus of the interference condition's resolution.

Moreover, it will be appreciated the aforementioned display 909 (and supporting circuitry) may be configured to generate display data or information (e.g., icons, changes in color, flashing alerts, textual messages, etc.) indicating to a user that (i) an IDC condition exists on their device, including optionally its severity or the radio interfaces involved, and/or (ii) actions that the user can take to mitigate the IDC condition (i.e., in addition to those implemented by the device/base station), such as where the automatically instituted actions are not completely successful at removing the IDC.

Exemplary Network Apparatus—

Figure 10:
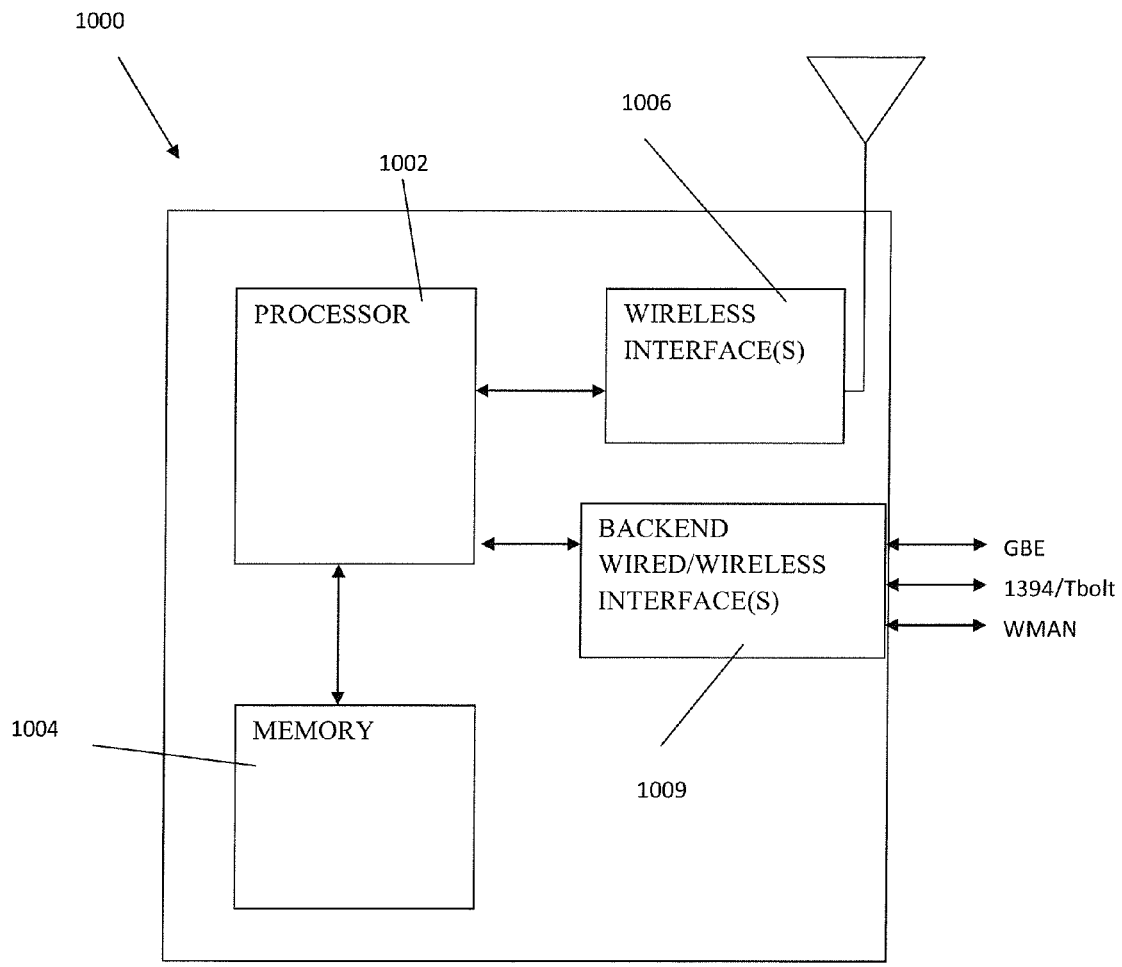
FIG. 10 is a functional block diagram of an exemplary network apparatus configured to mitigate IDC interference at a user device, according to one disclosed embodiment.

Referring now to FIG. 10, an exemplary embodiment of a network apparatus 1000 supporting a multi-radio interference mitigation scheme is illustrated. The apparatus may include, but is not limited to, macrocells, microcells, femtocells, picocells, wireless access points (e.g., Wi-Fi APs), or any combinations of the foregoing. While a specific device configuration and layout is shown and discussed, it is recognized that many other configurations may be readily implemented by one of ordinary skill given the present disclosure, the apparatus 1000 of FIG. 10 being merely illustrative of the broader principles disclosed herein.

The processing subsystem 1002 includes one or more of central processing units (CPU) or digital processors, such as a microprocessor, digital signal processor, field-programmable gate array, RISC core, or plurality of processing components mounted on one or more substrates. The processing subsystem is coupled to non-transitory computer-readable storage media such as memory 1004, which may include for example SRAM, FLASH, SDRAM, and/or HDD (Hard Disk Drive) components. The processing subsystem may also include additional co-processors. The processing subsystem 1002 includes discrete components; however, it is understood that in some embodiments they may be consolidated or fashioned in a SoC (system-on-chip) configuration.

The apparatus 1000 further includes one or more wireless interfaces 1006 which are configured to receive/send transmissions from/to client devices (including signals indicating multi-radio interference conditions at a client device). One or more "back end" interfaces 1009 are also provided, such as for communication with a network core entity, other base station, user interface device, etc. For instance, these back-end interfaces may include a GBE (Gigabit Ethernet), IEEE Std. 1394 or Thunderbolt™ interface, a WLAN or WMAN interface, satellite link, short range PAN or IR link, millimeter wave link, DOCSIS modem, optical, or any of a number of other known devices or interfaces.

In one exemplary embodiment, the non-transitory computer-readable storage media includes instructions which when executed by the processor, receive communications from one or more client devices in a cellular network, and implement multi-radio interference solutions for that client device(s).

In one exemplary embodiment, the non-transitory computer-readable storage media includes instructions which when executed by the processor, receives a signal from a client device indicating that the device is experiencing a multi-radio interference condition. In response, the network apparatus 1000 can implement a scheme to mitigate the multi-radio interference at the client device. In one implementation, the network apparatus 1000 schedules communications with the client device to mitigate multi-radio interference. For example, the communication can be schedule to avoid concurrent operation of radios or reducing the amount of communication occurring between the client device and server apparatus 1000 to reduce the activity time of one or radios.

The network apparatus 1000 can maintain the multi-radio interference scheme until it is notified by client device that the interference condition has been resolved.

It will also be appreciated that the network apparatus 1000 may be configured to coordinate with multiple clients simultaneously, such as where multiple clients are experiencing IDC conditions at the same time. Moreover, in some implementations, the apparatus 1000 may be equipped with intelligence (e.g., algorithms or other logic running on the processor) which can analyze for or detect common patters across two or more UEs, or even the potential for common interference sources that might create IDC conditions for two or more UEs. For instance, two multi-radio UEs operated in very close proximity to one another might interfere with the other's radio interfaces (e.g., Wi-Fi radio on UE-A interferes with LTE radio on UE-B, or vice versa). The apparatus 1000 can then institute actions to correct or mitigate the IDC conditions for one or both of the UEs as needed.

It will be recognized that while certain embodiments of the disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from the contents of the disclosure. The foregoing description is of the best mode presently contemplated. This description is in no way meant to be limiting, but rather should be taken as illustrative of the general principles embodied herein. The scope of the present disclosure should be determined with reference to the claims.

What is claimed is:

1. A method for mitigating multi-radio interference at a wireless device operating within a cellular network, the method comprising:
by the wireless device:
obtaining, from a second wireless device proximate to the wireless device via a wireless connection between the wireless device and the second wireless device, information about an interference condition between at least two radio interfaces of the wireless device to occur at a scheduled time;
in response to receipt of the information from the second wireless device, sending in-device coexistence (IDC) Condition Trigger message to the cellular network while in a discontinuous reception (DRX) ON mode;
in response to receipt of an IDC Condition Acknowledge message from the cellular network indicating successful receipt of the IDC Condition Trigger message, operating a first radio interface of the at least two radio interfaces of the wireless device in a DRX OFF mode at the scheduled time to mitigate the interference condition; and
subsequent to the scheduled time, operating the first radio interface of the wireless device in the DRX ON mode.

2. The method of claim 1, wherein the information about the interference condition comprises an indication of a determination of multi-radio interference to occur at the scheduled time at the wireless device.

3. The method of claim 1, wherein the information about the interference condition comprises metrics measured by the second wireless device for the wireless device.

4. The method of claim 1, wherein the first radio interface of the wireless device comprises a Long Term Evolution (LTE) cellular interface, and a second radio interface of the at least two radio interfaces of the wireless device operates in an Industrial Scientific Medical (ISM) frequency band.

5. The method of claim 4, wherein the second radio interface comprises a Wireless Local Area Network (WLAN) compliant interface.

6. The method of claim 1, wherein the wireless connection between the wireless device and the second wireless device comprises a Wi-Fi link or a Personal Area Network (PAN) link.

7. The method of claim 6, wherein proximity of the wireless device to the second wireless device is deemed sufficient for the second wireless device to measure metrics for the wireless device based on establishment of the PAN link.

8. A wireless device, comprising:
a processor;
a first wireless interface and a second wireless interface communicatively coupled to the processor and comprising one or more antennas; and
a memory storing instructions that, when executed by the processor, cause the wireless device to:
obtain, from a second wireless device proximate to the wireless device via a wireless connection between the wireless device and the second wireless device, information about an interference condition between the first wireless interface and the second wireless interface of the wireless device to occur at a scheduled time;
in response to receipt of the information from the second wireless device, send an in-device coexistence (IDC) Condition Trigger message to the cellular network while in a discontinuous reception (DRX) ON mode;
in response to receipt of an DC Condition Acknowledge message from the cellular network indicating successful receipt of the IDC Condition Trigger message, operate the first wireless interface in a DRX OFF mode at the scheduled time to mitigate the interference condition; and
subsequent to the scheduled time, operate the first wireless interface in the DRX ON mode.

9. The wireless device of claim 8, wherein the information about the interference condition comprises an indication of a determination of multi-radio interference to occur at the scheduled time at the wireless device.

10. The wireless device of claim 8, wherein the information about the interference condition comprises metrics measured by the second wireless device for the wireless device.

11. The wireless device of claim 8, wherein the first wireless interface of the wireless device comprises a Long Term Evolution (LTE) cellular wireless interface, and the second wireless interface operates in an Industrial Scientific Medical (ISM) frequency band.

12. The wireless device of claim 8, wherein the wireless connection between the wireless device and the second wireless device comprises a Wi-Fi link or a Personal Area Network (PAN) link.

13. The wireless device of claim 8, wherein proximity of the wireless device to the second wireless device is deemed sufficient for the second wireless device to measure metrics for the wireless device based on establishment of the PAN link.

14. An apparatus configurable for operation in a mobile wireless device, the apparatus comprising:
a processor; and
a memory storing instructions that, when executed by the processor, cause the mobile wireless device to:
obtain, from a second wireless device proximate to the mobile wireless device via a wireless connection between the mobile wireless device and the second wireless device, information about an interference condition between wireless interfaces of the mobile wireless device to occur at a scheduled time;
in response to receipt of the information from the second wireless device, send a first message to a cellular network;
in response to receipt of a second message from the cellular network indicating successful receipt of the first message, adjust operation of the wireless interfaces at the scheduled time to mitigate the interference condition; and subsequent to the scheduled time, readjust operation of the wireless interfaces.

15. The apparatus of claim 14, wherein the wireless connection between the mobile wireless device and the second wireless device comprises a Wi-Fi link or a Personal Area Network (PAN) link.

16. The apparatus of claim 14, wherein the information about the interference condition comprises metrics measured by the second wireless device for the mobile wireless device.

17. The apparatus of claim 14, wherein the mobile wireless device adjusts operation of the wireless interfaces at the scheduled time to mitigate the interference condition by adjusting discontinuous reception (DRX) timers to schedule longer periods of time where the mobile wireless device refrains from monitoring a downlink control channel to reduce activity of one the wireless interfaces.

18. The apparatus of claim 14, wherein the mobile wireless device adjusts operation of the wireless interfaces at the scheduled time to mitigate the interference condition by adjusting gap measurements to cause the mobile wireless device to measure and report neighbor cell search measurements less frequently to reduce activity of one of the wireless interfaces.

19. The apparatus of claim 14, wherein the first message sent to the wireless network comprises an estimation of an activity time for one of the wireless interfaces, and the second message received from the wireless network comprises an adjustment to discontinuous reception (DRX) timers or measurement gap parameters based on the estimation of activity time.

20. The apparatus of claim 19, wherein the estimation of the activity time for one of the wireless interfaces comprises an estimate of ISM-radio transmission intervals for the one of the wireless interfaces.

* * * * *